(12) United States Patent
Suquet

(10) Patent No.: US 8,030,915 B2
(45) Date of Patent: Oct. 4, 2011

(54) INTEGRATED SENSOR WITH CAPACITIVE COUPLING REJECTION TO THE MECHANICAL GROUND

(75) Inventor: Michel Suquet, Villeneuve-Tolosane (FR)

(73) Assignee: Continental Automotive France, Toulouse (FR)

( * ) Notice: Subject to any disclaimer, the term of this patent is extended or adjusted under 35 U.S.C. 154(b) by 285 days.

(21) Appl. No.: 12/521,709

(22) PCT Filed: Dec. 3, 2007

(86) PCT No.: PCT/EP2007/010475
§ 371 (c)(1),
(2), (4) Date: Jun. 29, 2009

(87) PCT Pub. No.: WO2008/080481
PCT Pub. Date: Jul. 10, 2008

(65) Prior Publication Data
US 2010/0321002 A1    Dec. 23, 2010

(30) Foreign Application Priority Data
Dec. 28, 2006 (FR) .................................. 06 11467

(51) Int. Cl.
*G01R 1/30* (2006.01)
*G01R 17/16* (2006.01)
(52) U.S. Cl. ..................................... 324/123 R; 324/109
(58) Field of Classification Search .................. 324/109, 324/123 R; 310/316.03
See application file for complete search history.

(56) References Cited

U.S. PATENT DOCUMENTS

| 4,857,842 A | | 8/1989 | Sturman | |
|---|---|---|---|---|
| 5,041,780 A | * | 8/1991 | Rippel | ...................... 324/117 H |
| 5,656,929 A | * | 8/1997 | Humpherys | .................... 324/95 |
| 2004/0032246 A1 | * | 2/2004 | Motz | ........................ 324/117 H |

FOREIGN PATENT DOCUMENTS

| EP | 0710825 | 5/1996 |
|---|---|---|
| WO | 9627979 | 9/1996 |

OTHER PUBLICATIONS

International Search Report dated Apr. 9, 2008, in PCT application.

* cited by examiner

*Primary Examiner* — Huy Q Phan
*Assistant Examiner* — Joshua Benitez
(74) *Attorney, Agent, or Firm* — Young & Thompson

(57) ABSTRACT

An integrated sensor includes: i) a voltage regulator coupled with a mechanical ground and delivering a regulated voltage based on a primary power supply voltage referencing an electrical ground; ii) a high-impedance sensitive element powered by the primary power supply, electrically coupled to the mechanical ground and delivering an electrical quantity representative of a physical quantity; iii) an amplification module powered by the regulated voltage and including a first input receiving an analog reference dependent on the regulated voltage and a second input receiving the electrical quantity, and designed to deliver a first output voltage representing the amplified measurement voltage; and iv) a differential amplifier powered by the primary power supply voltage, referencing the electrical ground and including first and a second inputs receiving the analog reference and the first output voltage, respectively, and delivering a second output voltage representing the first amplified output voltage referenced to the electrical ground.

20 Claims, 1 Drawing Sheet

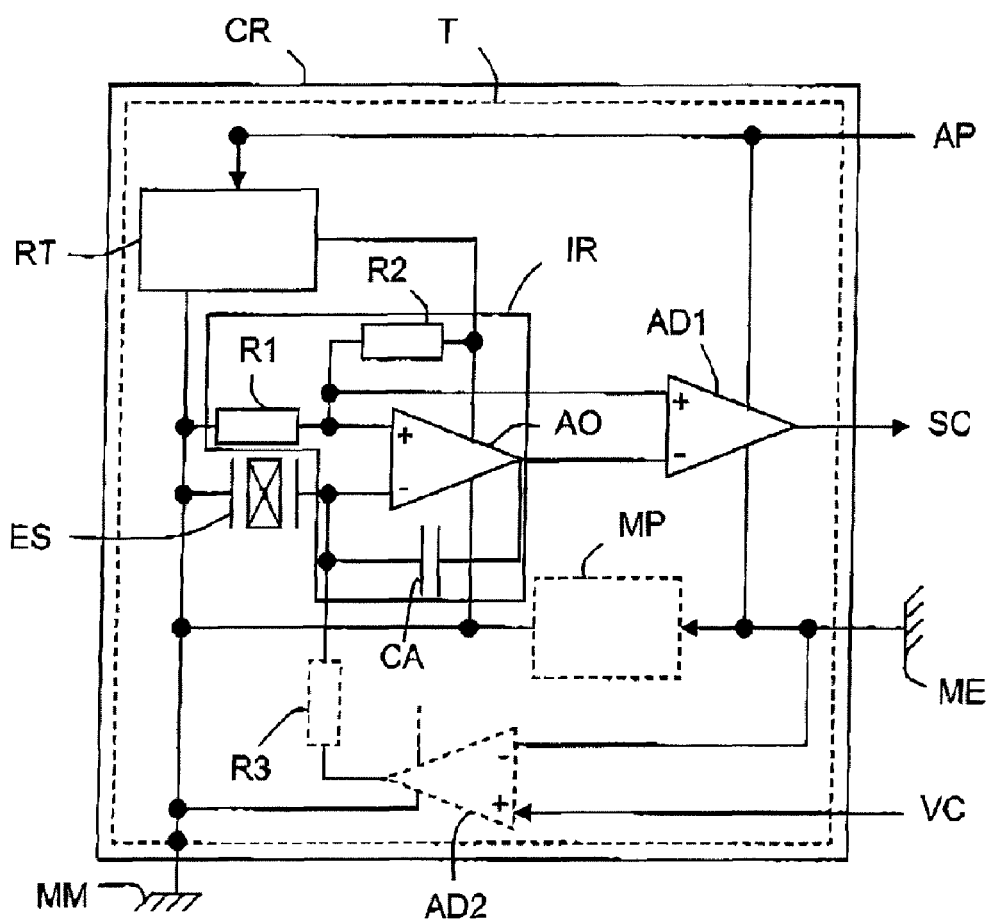
Single figure

INTEGRATED SENSOR WITH CAPACITIVE COUPLING REJECTION TO THE MECHANICAL GROUND

The invention relates to integrated sensors furnished with a high-impedance, or very-high-impedance sensitive element.

Here the expression "integrated sensor" is intended to mean an apparatus (or device) comprising a (very-) high-impedance sensitive element, designated to deliver a measurement voltage representative of a physical quantity, and coupled to electronic components, and in particular to a voltage regulator and to an amplification integrator (or integrator amplifier), the whole being optionally integrated inside a metallic receptacle.

In an integrated sensor of the aforesaid type, the voltage regulator is intended to deliver a regulated voltage on the basis of a primary power supply voltage which is referenced with respect to an electrical ground, and the integrator powered by this regulated voltage, comprises a first input receiving a secondary voltage dependent on the regulated voltage and a second input receiving the measurement voltage from the sensitive element, and designated to deliver a first output voltage which is representative of the amplified measurement voltage.

As known by the person skilled in the art, when an integrated sensor is housed in a metallic receptacle, itself installed in an electrically disturbed environment, as for example in a motor vehicle engine, its receptacle is electrically coupled to the mechanical ground. Its sensitive element is then also electrically coupled to the mechanical ground by capacitive coupling, on account of its (very) high impedance. Because of the intensity of the currents which flow around certain apparatuses connected to the mechanical ground (for example those delivered by a starter), the capacitive coupling of the sensitive element may induce variations in its measurement voltage of typically ±1 Volt (V), so that the Latter is no longer actually representative of the physical quantity measured.

In order to remedy this drawback, it is possible to place an electromagnetic shield around the sensitive element. But such a shield is generally expensive and/or cumbersome.

It is also possible to power the sensitive element by means of a supply voltage referenced with respect to the mechanical ground. But this only partially solves the problem, given that the integrator is itself powered by a regulated voltage which is referenced with respect to the electrical ground.

It is also possible to operate the integrator in differential mode, but this is not effective on account of the asymmetry of the isolation impedances of its inverting and non-inverting inputs with respect to the mechanical ground.

The aim of the invention is therefore to improve the situation, and more precisely to reject at least partially the capacitive coupling of the sensitive element to the mechanical ground, without using an electromagnetic shield.

It proposes for this purpose an integrated sensor of the type presented in the introduction, and therefore comprising:
- a voltage regulator designated to deliver a regulated voltage on the basis of a primary power supply voltage referenced with respect to an electrical ground,
- a (very-) high-impedance sensitive element powered by the primary power supply voltage and designated to deliver an electrical measurement quantity representative of a physical quantity, and
- an amplification module (optionally of integrator type) powered by the regulated voltage, comprising a first input receiving an analog reference dependent on the regulated voltage and a second input receiving the electrical measurement quantity, and designated to deliver a first output voltage representative of the amplified measurement voltage.

This integrated sensor is characterized by the fact:
- that its sensitive element and its voltage regulator are both coupled electrically to the mechanical ground, and
- that it comprises a first differential amplifier powered by the primary power supply voltage, referenced electrically with respect to the electrical ground and comprising a first input suitable for receiving the analog reference and a second input suitable for receiving the first output voltage, and designated to deliver a second output voltage representative of the first amplified output voltage and referenced with respect to the electrical ground.

The integrated sensor according to the invention can comprise other characteristics which can be taken separately or in combination, and in particular:
- it can comprise protection means coupled electrically, on the one hand, to the electrical ground, and on the other hand, to the mechanical ground, and designated to protect the amplification module against electrostatic discharges;
- it can comprise feedback means connected to the second input of the amplification module, coupled to the electrical ground, and designated to induce in the amplification module a reduction in the influence of spurious electrical glitches present at this second input of the amplification module and of the sensitive element;
- for example, the feedback means can comprise, on the one hand, a second differential amplifier referenced with respect to the mechanical ground and comprising a first input receiving an auxiliary feedback voltage representative of the spurious electrical glitches detected and a second input coupled electrically to the electrical ground, so as to deliver a third output voltage representative of the auxiliary voltage, and on the other hand, a resistor comprising a first terminal receiving the third output voltage and a second terminal electrically connected to the second input of the amplification module;
- this second differential amplifier can be powered by the regulated voltage;
- its amplification module can comprise, firstly, an operational amplifier powered by the regulated voltage, comprising a non-inverting input defining the first input (which receives the analog reference) and an inverting input defining the second input (which receives the electrical measurement quantity), and designated to deliver the first output voltage, secondly, a capacitive element comprising first and second terminals respectively connected to the output and to the inverting input of the operational amplifier, and thirdly, a divider bridge comprising a first resistor furnished with a first terminal electrically coupled to the mechanical ground and with a second terminal connected to the non-inverting input of the operational amplifier, and a second resistor furnished with a first terminal electrically connected to the output of the voltage regulator so as to receive the regulated voltage and with a second terminal connected to said non-inverting input of the operational amplifier;
- it can comprise a metallic receptacle housing its voltage regulator, its sensitive element, its amplification module and its first differential amplifier, as well as the optional protection means and feedback means, and intended to be electrically coupled to the mechanical ground.

The invention is particularly well adapted, although not exclusively, to the integrated sensors in which the sensitive element is a piezoelectric element.

Other characteristics and advantages of the invention will become apparent on examining the description detailed hereinafter, and the appended drawing, in which the single FIGURE illustrates in a schematic and functional manner an exemplary embodiment of an integrated sensor according to the invention.

The appended drawing will enable not only to serve to supplement the invention, but also contribute to its definition, if appropriate.

The object of the invention is to allow the construction of integrated sensors (as defined in the introductory part) in which the capacitive coupling of the sensitive element to the mechanical ground is at least partially rejected, without using an electromagnetic shield.

In the following text, it is considered by way of nonlimiting example that the integrated sensor with (very) high impedance is intended to be implanted in a motor vehicle, for example inside its engine, so as to provide measurement voltages representative of a physical quantity. But, the invention is not limited to this type of application. It actually relates to any type of integrated sensor with (very) high impedance intended to be installed in an electrically disturbed environment, and in particular those used in industrial applications.

As schematically and functionally illustrated in the single FIGURE, an integrated sensor CR, according to the invention, comprises at least one voltage regulator RT, a sensitive element ES with high (or very high) impedance, an amplification module IR (arranged in the form of an integrator amplifier or of an amplifier with high input impedance) and a first differential amplifier AD1.

In the following text, it is considered that the integrated sensor CR also comprises a metallic receptacle T (for example a tube), coupled electrically to the mechanical ground MM of the engine in which it is implanted, and in which all its other constituents (in particular RT, ES, IR, AD1) are housed.

Moreover, it is considered in the following text, by way of illustrative and nonlimiting example, that the sensitive element ES is a piezoelectric element designated to convert a mechanical stress, such as for example a pressure (physical quantity), into an electrical charge (hereinafter called the measurement charge QM). More precisely, in this example the sensitive element ES delivers an electrical measurement quantity in the form of a measurement current IM dependent on its measurement charge QM which is proportional to the measured physical quantity. For example, this piezoelectric element ES exhibits a capacitance of 6 pF. But, the invention is not limited to this type of sensitive element. Indeed it relates to any type of sensitive element with (very) high impedance capable of delivering an electrical measurement quantity representative of a physical quantity. Thus, it may for example be an oxygen probe delivering as output an electrical measurement quantity in the form of a measurement voltage.

According to the invention, the sensitive element ES is coupled electrically to the mechanical ground MM via a conducting connection which links it electrically to the metallic receptacle T.

The voltage regulator RT is powered by a primary power supply voltage AP which is referenced with respect to an electrical ground ME, for example that of a computer in charge of engine control.

According to the invention, this voltage regulator RT is coupled electrically to the mechanical ground MM via a conducting connection which links it electrically to the metallic receptacle T. It is therefore designated to transform the primary power supply voltage AP into a regulated voltage VR referenced with respect to the mechanical ground MM.

By way of nonlimiting example, the regulated voltage is equal to 3 V (Volts).

The amplification module IR is powered by the regulated voltage VR. In the case of a sensitive element ES of piezoelectric sensor type, the amplification module IR is an integrator amplifier comprising first (+) and second (−) inputs and an output. It is here designated to convert, by integration, the measurement current IM (derived from the charge QM) delivered by the sensitive element ES into a first output voltage VS1.

The first input (+) is designated to receive an analog reference constructed on the basis of the regulated voltage VR. In the example illustrated, this analog reference is a voltage reference (or constant potential) VP.

The second input (−) is connected to that terminal of the sensitive element ES that is not connected to the mechanical ground MM. It is maintained at the constant potential VP, for example (and as illustrated) by a capacitive loopback element CA (for example a capacitor).

The output of the amplifier (integrator) IR is designated to deliver the first output voltage VS1 which is representative of the measurement charge QM amplified by virtue of a gain function equal to the inverse of the capacitance Cca of the capacitive loopback element CA.

As is illustrated in the single FIGURE, the amplifier IR comprises for example an operational amplifier AO coupled to the capacitive element CA and to a divider bridge R1, R2.

The operational amplifier AO comprises a power supply input so as to be powered by the regulated voltage VR, a non-inverting input (+) which constitutes the first input of the amplifier IR and is therefore designated to receive the voltage reference VP, an inverting input (−) which constitutes the second input of the amplifier IR and is therefore designated to receiving the current IM delivered by the sensitive element ES (dependent on the measurement charge QM), and an output which constitutes the output of the amplifier IR and is therefore designated to deliver the first output voltage VS1.

This operational amplifier AO functions in an entirely conventional manner. It delivers on its output a first output voltage VS1 such that the potential of its inverting input (−) remains at the constant potential VP of its non-inverting input (+). It also provides through the capacitive loopback element CA the current which is necessary for maintaining the potential of the sensitive element ES at a constant value. The first output voltage VS1 is therefore equal to the constant potential VP increased by the voltage VCa across the terminals of the capacitive loopback element CA, which (Vca) is given by the integral of the current IM provided by the sensitive element ES (Vca=∫IM.dt/Cca=Qm/Cca, where Cca is the capacitance of the capacitive loopback element CA).

The capacitive loopback element CA comprises first and second terminals connected respectively to the output and to the inverting input (−) of the operational amplifier AO.

The divider bridge comprises for example first resistors R1 and second resistors R2. The first resistor R1 comprises a first terminal which is coupled electrically to the mechanical ground MM, via a conducting connection which links it electrically to the metallic receptacle T, and a second terminal which is connected to the non-inverting input (+) of the operational amplifier AO. The second resistor R2 comprises a first terminal which is connected electrically to the output of the voltage regulator RT, so as to receive the regulated voltage, and a second terminal connected to the non-inverting input (+) of the operational amplifier AO so as to provide it with the voltage reference (or constant potential) VP.

By virtue of this arrangement, when the electrical potential of the mechanical ground MM varies, the voltage across the terminals of the sensitive element ES does not vary. The capacitive loopback element CA no longer receiving current, its charge remains constant and it therefore maintains the second input (−) of the amplifier IR at the constant potential VP. It follows from this that there is no longer any "noise" at the output of the operational amplifier AO.

The first differential amplifier AD1 comprises a power supply input which is powered by the primary power supply voltage AP, and a ground input coupled electrically to the electrical ground ME, via a conducting connection. It is thus referenced electrically with respect to the electrical ground ME. It furthermore comprises a first input (+), for example of non-inverting type, connected to the bias point of the operational amplifier AO (that is to say at the level of its non-inverting input (+)) and therefore placed at a voltage VP defined by the divider bridge R1, R2 at this bias point, and a second input (−), for example of inverting type, designated to receiving the first output voltage VS1. Finally, it comprises an output designated to deliver a second output voltage VS2 which is representative of the first output voltage VS1 amplified by virtue of a gain function and referenced with respect to the electrical ground ME.

It will be noted that in variant embodiments the first input (+) of the first differential amplifier AD1 could be referenced to the mechanical ground MM or to the voltage delivered by the voltage regulator RT.

This first differential amplifier AD1 operates in an entirely conventional manner. In the exemplary embodiment illustrated, it delivers on its output a second output voltage VS2 which is proportional to the difference between the first output voltage VS1 and the voltage VP defined by the divider bridge R1, R2 (VS2∝B*(VS1−VP), where B is the gain which can be positive or negative).

As is illustrated in the single FIGURE, the integrated sensor CR according to the invention can also and optionally comprise a protection module MP designated to protect its amplifier IR against possible electrostatic discharges (or ESD) which arise in the presence of a large variation in the electrical potential at which the mechanical ground MM is placed. For this purpose, the protection module MP is coupled electrically, on the one hand, to the electrical ground ME via a conducting connection, and on the other hand, to the mechanical ground MM via a conducting connection which links it electrically to the metallic receptacle T.

For example, the protection module MP can be made from an appropriate combination of diodes and/or transistors. For example, it can be constructed by arranging two pairs of diodes in parallel, a first pair comprising two diodes in series, and a second pair comprising two diodes in series arranged in an opposite manner to the diodes of the first pair.

Since the amplifier IR delivers a first output voltage VS1 of floating type, it is advantageous to reject as far as possible the spurious voltages which reach its second input (−). Accordingly, and as is illustrated in the single FIGURE, the integrated sensor CR according to the invention can also and optionally comprise a feedback module AD2, R3 designated to reduce at the level of its amplifier IR the influence of the spurious electrical glitches which may be present at the second input (−) of the amplifier IR and of the sensitive element ES and which are liable to disturb the measurement charge QM of the sensitive element ES due to the fact that it is powered by the primary power supply voltage AP which is referenced with respect to the electrical ground ME. In fact this involves compensating for the shifts (or "offset") in current and in voltage of the operational amplifier AO and the very low frequency glitches produced by the sensitive element ES due to drift with temperature.

For this purpose, this feedback module AD2, R3 is connected to the second input (−) of the amplifier IR and coupled to the electrical ground ME and receives a feedback auxiliary voltage VC of a control apparatus (which does not form part of the invention, and which may be the engine control unit). This control apparatus is more precisely designated to eliminate the spurious electrical glitches which are present at the second input (−) of the amplifier IR and of the sensitive element ES. Accordingly, it generates a feedback auxiliary voltage VC intended to oppose the action of the spurious electrical glitches on the measurement charge QM of the sensitive element ES.

For example, and as illustrated in the single FIGURE, the feedback module can comprise a second differential amplifier AD2 arranged in series with a resistor R3.

The second differential amplifier AD2 then comprises a power supply input which can be powered by the regulated voltage VR, a ground input coupled electrically to the mechanical ground MM via a conducting connection which links it electrically to the metallic receptacle T, a first input receiving the feedback auxiliary voltage VC, a second input coupled electrically to the electrical ground ME, via a conducting connection, and an output delivering a third output voltage VS3 representative of the feedback auxiliary voltage VC. This second differential amplifier AD2 operates in an entirely conventional manner. It delivers on its output a third output voltage VS3 which is proportional to the difference between the voltage VME of the electrical ground ME and the feedback auxiliary voltage VC (VS3∝C*(VME−VC), where C is the gain).

The resistor R3 comprises a first terminal connected to the output of the second differential amplifier AD2 so as to receive the third output voltage VS3, and a second terminal connected electrically to the second input (−) of the amplifier IR.

By virtue of the invention, the rejection of the spurious electrical glitches present on the mechanical ground MM is ensured by the on-line regulation performed by the voltage regulator RT and by the common-mode rejection of the first differential amplifier AD1 as well as the optional second differential amplifier AD2.

The invention is not limited to the integrated sensor embodiments described above, solely by way of example, but it encompasses all the variants that may be envisaged by the person skilled in the art.

Thus, in the foregoing, an exemplary embodiment of an integrated sensor in which the sensitive element is a piezoelectric sensor was described. However, as indicated previously, the sensitive element could be of another type. It could for example entail an oxygen probe delivering on its output an electrical measurement quantity in the form of a measurement voltage. In this case, the amplification module is not an integrator amplifier, but an amplifier with high input impedance comprising a first input (non-inverting) receiving the measurement voltage (preferably via a resistor) and a second input (inverting) forming the subject of a resistive feedback (the capacitive loopback element CA of the preceding exemplary embodiment is here replaced with a resistive loopback element (for example a resistor)).

The invention claimed is:
1. An integrated sensor (CR), comprising
   i) a voltage regulator (RT) suitable for delivering a regulated voltage on the basis of a primary power supply voltage (AP) referenced with respect to an electrical ground (ME),
   ii) a high-impedance sensitive element (ES) powered by said primary power supply voltage (AP) and suitable for delivering an electrical measurement quantity representative of a physical quantity, and iii) an amplification module (IR) powered by said regulated voltage and comprising a first input (+) suitable for receiving an analog reference dependent on said regulated voltage and a second input (−) receiving said electrical measurement quantity, and designed to deliver a first output voltage representative of said amplified measurement voltage, characterized in that said sensitive element (ES) and said voltage regulator (RT) are coupled electrically to a mechanical ground (MM), and in that it comprises a first differential amplifier (AD1) powered by said primary power supply voltage (AP), referenced electrically with respect to said electrical ground (ME) and comprising a first input suitable for receiving said analog reference and a second input suitable for receiving said first output voltage, and designed to deliver a second output voltage representative of the first amplified output voltage and referenced with respect to said electrical ground (ME).

2. The integrated sensor as claimed in claim 1, characterized in that it comprises protection means (MP) coupled electrically, on the one hand, to said electrical ground (ME), and on the other hand, to said mechanical ground (MM), and designed to protect said amplification module (IR) against electrostatic discharges.

3. The integrated sensor as claimed in claim 2, characterized in that it comprises feedback means (AD2, R3) connected to said second input (−) of said amplification module (IR) and coupled to said electrical ground (ME), and designed to induce at the level of said amplification module (IR) a reduction in the influence of spurious electrical glitches present at the level of said second input (−) of said amplification module (IR) and of said sensitive element (ES).

4. The integrated sensor as claimed in claim 2, characterized in that said amplification module (IR) comprises:
   i) an operational amplifier (AO) powered by said regulated voltage, comprising a non-inverting input (+) defining said first input receiving said analog reference and an inverting input (−) defining said second input receiving said electrical measurement quantity, and designed to deliver said first output voltage,
   ii) a capacitive element (CA) comprising first and second terminals connected respectively to the output and to the inverting input (−) of said operational amplifier (AO), and
   iii) a divider bridge (R1, R2) comprising a first resistor (R1) furnished with a first terminal coupled electrically to said mechanical ground (MM) and with a second terminal connected to said non-inverting input (+) of the operational amplifier (AO), and a second resistor (R2) furnished with a first terminal connected electrically to the output of said voltage regulator (RT) so as to receive said regulated voltage and with a second terminal connected to said non-inverting input (+) of the operational amplifier (AO).

5. The integrated sensor as claimed in claim 2, characterized in that it comprises a metallic receptacle (T) housing said voltage regulator (RT), said sensitive element (ES), said amplification module (IR) and said first differential amplifier (AD1), as well as the optional protection means (MP) and feedback means (AD2, R3), and suitable for being coupled electrically to said mechanical ground (MM).

6. The integrated sensor as claimed in claim 2, characterized in that said sensitive element (ES) is a piezoelectric element.

7. The integrated sensor as claimed in claim 1, characterized in that it comprises feedback means (AD2, R3) connected to said second input (−) of said amplification module (IR) and coupled to said electrical ground (ME), and designed to induce at the level of said amplification module (IR) a reduction in the influence of spurious electrical glitches present at the level of said second input (−) of said amplification module (IR) and of said sensitive element (ES).

8. The integrated sensor as claimed in claim 7, characterized in that it comprises
   i) a second differential amplifier (AD2) referenced with respect to the mechanical ground (MM) and comprising a first input (+) receiving a feedback auxiliary voltage (VC) representative of said spurious electrical glitches detected and a second input (−) coupled electrically to said electrical ground (ME), so as to deliver a third output voltage representative of said auxiliary voltage, and
   ii) a resistor (R3) comprising a first terminal receiving said third output voltage and a second terminal connected electrically to said second input (−) of said amplification module (IR).

9. The integrated sensor as claimed in claim 8, characterized in that said second differential amplifier (AD2) is powered by said regulated voltage.

10. The integrated sensor as claimed in claim 9, characterized in that said amplification module (IR) comprises:
    i) an operational amplifier (AO) powered by said regulated voltage, comprising a non-inverting input (+) defining said first input receiving said analog reference and an inverting input (−) defining said second input receiving said electrical measurement quantity, and designed to deliver said first output voltage,
    ii) a capacitive element (CA) comprising first and second terminals connected respectively to the output and to the inverting input (−) of said operational amplifier (AO), and
    iii) a divider bridge (R1, R2) comprising a first resistor (R1) furnished with a first terminal coupled electrically to said mechanical ground (MM) and with a second terminal connected to said non-inverting input (+) of the operational amplifier (AO), and a second resistor (R2) furnished with a first terminal connected electrically to the output of said voltage regulator (RT) so as to receive said regulated voltage and with a second terminal connected to said non-inverting input (+) of the operational amplifier (AO).

11. The integrated sensor as claimed in claim 9, characterized in that it comprises a metallic receptacle (T) housing said voltage regulator (RT), said sensitive element (ES), said amplification module (IR) and said first differential amplifier (AD1), as well as the optional protection means (MP) and feedback means (AD2, R3), and suitable for being coupled electrically to said mechanical ground (MM).

12. The integrated sensor as claimed in claim 8, characterized in that said amplification module (IR) comprises:
    i) an operational amplifier (AO) powered by said regulated voltage, comprising a non-inverting input (+) defining said first input receiving said analog reference and an inverting input (−) defining said second input receiving said electrical measurement quantity, and designed to deliver said first output voltage,
    ii) a capacitive element (CA) comprising first and second terminals connected respectively to the output and to the inverting input (−) of said operational amplifier (AO), and iii) a divider bridge (R1, R2) comprising a first resistor (R1) furnished with a first terminal coupled electrically to said mechanical ground (MM) and with a second terminal connected to said non-inverting input (+) of the operational amplifier (AO), and a second resistor (R2) furnished with a first terminal connected electrically to the output of said voltage regulator (RT) so as to receive said regulated voltage and with a second terminal connected to said non-inverting input (+) of the operational amplifier (AO).

13. The integrated sensor as claimed in claim 8, characterized in that it comprises a metallic receptacle (T) housing said voltage regulator (RT), said sensitive element (ES), said amplification module (IR) and said first differential amplifier (AD1), as well as the optional protection means (MP) and feedback means (AD2, R3), and suitable for being coupled electrically to said mechanical ground (MM).

14. The integrated sensor as claimed in claim 7, characterized in that said amplification module (IR) comprises:
   i) an operational amplifier (AO) powered by said regulated voltage, comprising a non-inverting input (+) defining said first input receiving said analog reference and an inverting input (−) defining said second input receiving said electrical measurement quantity, and designed to deliver said first output voltage,
   ii) a capacitive element (CA) comprising first and second terminals connected respectively to the output and to the inverting input (−) of said operational amplifier (AO), and
   iii) a divider bridge (R1, R2) comprising a first resistor (R1) furnished with a first terminal coupled electrically to said mechanical ground (MM) and with a second terminal connected to said non-inverting input (+) of the operational amplifier (AO), and a second resistor (R2) furnished with a first terminal connected electrically to the output of said voltage regulator (RT) so as to receive said regulated voltage and with a second terminal connected to said non-inverting input (+) of the operational amplifier (AO).

15. The integrated sensor as claimed in claim 7, characterized in that it comprises a metallic receptacle (T) housing said voltage regulator (RT), said sensitive element (ES), said amplification module (IR) and said first differential amplifier (AD1), as well as the optional protection means (MP) and feedback means (AD2, R3), and suitable for being coupled electrically to said mechanical ground (MM).

16. The integrated sensor as claimed in claim 7, characterized in that said sensitive element (ES) is a piezoelectric element.

17. The integrated sensor as claimed in claim 1, characterized in that said amplification module (IR) comprises:
   i) an operational amplifier (AO) powered by said regulated voltage, comprising a non-inverting input (+) defining said first input receiving said analog reference and an inverting input (−) defining said second input receiving said electrical measurement quantity, and designed to deliver said first output voltage,
   ii) a capacitive element (CA) comprising first and second terminals connected respectively to the output and to the inverting input (−) of said operational amplifier (AO), and
   iii) a divider bridge (R1, R2) comprising a first resistor (R1) furnished with a first terminal coupled electrically to said mechanical ground (MM) and with a second terminal connected to said non-inverting input (+) of the operational amplifier (AO), and a second resistor (R2) furnished with a first terminal connected electrically to the output of said voltage regulator (RT) so as to receive said regulated voltage and with a second terminal connected to said non-inverting input (+) of the operational amplifier (AO).

18. The integrated sensor as claimed in claim 17, characterized in that it comprises a metallic receptacle (T) housing said voltage regulator (RT), said sensitive element (ES), said amplification module (IR) and said first differential amplifier (AD1), as well as the optional protection means (MP) and feedback means (AD2, R3), and suitable for being coupled electrically to said mechanical ground (MM).

19. The integrated sensor as claimed in claim 1, characterized in that it comprises a metallic receptacle (T) housing said voltage regulator (RT), said sensitive element (ES), said amplification module (IR) and said first differential amplifier (AD1), as well as the optional protection means (MP) and feedback means (AD2, R3), and suitable for being coupled electrically to said mechanical ground (MM).

20. The integrated sensor as claimed in claim 1, characterized in that said sensitive element (ES) is a piezoelectric element.

* * * * *